US008875030B1

(12) United States Patent
Loverin et al.

(10) Patent No.: US 8,875,030 B1
(45) Date of Patent: Oct. 28, 2014

(54) COLOR CODING AND SELECTION HIGHLIGHTING OF E-MAIL ITEM LISTING

(75) Inventors: Darrell J. Loverin, Boxborough, MA (US); Jodi L. Coppinger, Merrimack, NH (US); Mary Elizabeth Raven, Merrimack, NH (US); Paul B. Moody, Hyde Park, VT (US)

(73) Assignee: Google Inc., Mountain View, CA (US)

( * ) Notice: Subject to any disclaimer, the term of this patent is extended or adjusted under 35 U.S.C. 154(b) by 35 days.

(21) Appl. No.: 13/410,963

(22) Filed: Mar. 2, 2012

Related U.S. Application Data

(63) Continuation of application No. 10/745,485, filed on Dec. 29, 2003, now Pat. No. 8,151,214.

(51) Int. Cl.
G06F 3/00 (2006.01)
G06F 3/01 (2006.01)

(52) U.S. Cl.
USPC .......................... 715/752; 715/821; 715/823

(58) Field of Classification Search
USPC ........................................ 715/752, 821, 823
See application file for complete search history.

(56) References Cited

U.S. PATENT DOCUMENTS

| | | |
|---|---|---|
| 4,694,406 A | 9/1987 | Shibui et al. |
| 4,853,878 A * | 8/1989 | Brown .......................... 715/202 |
| 5,038,138 A | 8/1991 | Akiyama et al. |
| 5,175,813 A | 12/1992 | Golding et al. |
| 5,317,306 A | 5/1994 | Abraham et al. |
| 5,361,361 A | 11/1994 | Hickman et al. |
| 5,394,523 A | 2/1995 | Harris |
| 5,398,310 A | 3/1995 | Tchao et al. |
| 5,506,951 A | 4/1996 | Ishikawa |
| 5,526,480 A | 6/1996 | Gibson |

(Continued)

FOREIGN PATENT DOCUMENTS

| | | |
|---|---|---|
| CN | 1194703 | 9/1998 |
| CN | 1285557 | 2/2001 |

(Continued)

OTHER PUBLICATIONS

Venolia, Gina, et al., "Understanding Sequence and Reply Relationship within Email Conversations: A Mixed-Model Visualization", Paper: Intergrating Tools and Tasks, vol. No. 5, Issue No. 1, Ft. Lauderdale, Florida, Apr. 5-10, 2003, pp. 361-368.

(Continued)

*Primary Examiner* — Nicholas Augustine
(74) *Attorney, Agent, or Firm* — Young Basile Hanlon & Macfarlane P.C.

(57) ABSTRACT

A method for rendering an e-mail item listing within a graphical user interface of an e-mail application on a display device is disclosed. The method includes identifying a field of the e-mail item listing having a displayed value that matches a pre-determined value, applying a color coding to the identified field so that the color coding is visually distinguishable from a background color of the e-mail item listing, receiving an input from an input device to select either an item of the e-mail item listing that includes a color coded field or an item related to the item that includes the color coded field, and applying a selection highlighting to the item that includes the color coded field so that the applied selection highlighting is visually distinguishable from the color coded field and the background color.

20 Claims, 5 Drawing Sheets

(56) References Cited

U.S. PATENT DOCUMENTS

| | | |
|---|---|---|
| 5,563,996 A | 10/1996 | Tchao |
| 5,610,828 A | 3/1997 | Kodosky et al. |
| 5,623,613 A | 4/1997 | Rowe et al. |
| 5,682,511 A | 10/1997 | Sposato et al. |
| 5,732,399 A | 3/1998 | Katiyar et al. |
| 5,737,553 A | 4/1998 | Bartok |
| 5,812,123 A | 9/1998 | Rowe et al. |
| 5,870,770 A | 2/1999 | Wolfe |
| 5,894,311 A * | 4/1999 | Jackson ................ 345/440 |
| 5,903,267 A | 5/1999 | Fisher |
| 5,905,863 A | 5/1999 | Knowles et al. |
| 5,918,233 A | 6/1999 | La Chance et al. |
| 5,930,801 A | 7/1999 | Falkenhainer et al. |
| 5,948,058 A | 9/1999 | Kudoh et al. |
| 5,999,159 A | 12/1999 | Isomura |
| 5,999,179 A | 12/1999 | Kekic et al. |
| 6,008,803 A | 12/1999 | Rowe et al. |
| 6,026,388 A | 2/2000 | Liddy et al. |
| 6,034,688 A | 3/2000 | Greenwood et al. |
| 6,052,121 A | 4/2000 | Webster et al. |
| 6,078,306 A | 6/2000 | Lewis |
| 6,088,696 A | 7/2000 | Moon et al. |
| 6,154,740 A | 11/2000 | Shah |
| 6,184,881 B1 | 2/2001 | Medl |
| 6,252,597 B1 | 6/2001 | Lokuge |
| 6,272,537 B1 | 8/2001 | Kekic et al. |
| 6,289,361 B1 | 9/2001 | Uchida |
| 6,300,967 B1 | 10/2001 | Wagner et al. |
| 6,340,979 B1 | 1/2002 | Beaton et al. |
| 6,348,935 B1 | 2/2002 | Malacinski et al. |
| 6,380,947 B1 | 4/2002 | Stead |
| 6,388,682 B1 | 5/2002 | Kurtzberg et al. |
| 6,396,513 B1 | 5/2002 | Helfman et al. |
| 6,424,995 B1 | 7/2002 | Shuman |
| 6,442,440 B1 | 8/2002 | Miller |
| 6,499,026 B1 * | 12/2002 | Smith et al. ............ 1/1 |
| 6,529,744 B1 | 3/2003 | Birkler et al. |
| 6,549,218 B1 | 4/2003 | Gershony et al. |
| 6,563,518 B1 | 5/2003 | Gipalo |
| 6,582,474 B2 | 6/2003 | LaMarca et al. |
| 6,628,996 B1 | 9/2003 | Sezaki et al. |
| 6,631,398 B1 | 10/2003 | Klein |
| 6,700,591 B1 | 3/2004 | Sharpe |
| 6,701,346 B1 | 3/2004 | Klein |
| 6,738,787 B2 | 5/2004 | Stead |
| 6,756,997 B1 | 6/2004 | Ward et al. |
| 6,782,393 B1 | 8/2004 | Balabanovic et al. |
| 6,826,596 B1 | 11/2004 | Suzuki |
| 6,829,601 B2 | 12/2004 | Honda et al. |
| 6,895,404 B2 | 5/2005 | Rowley |
| 6,917,373 B2 | 7/2005 | Vong et al. |
| 6,930,709 B1 | 8/2005 | Creamer et al. |
| 6,972,776 B2 | 12/2005 | Davis et al. |
| 7,028,263 B2 | 4/2006 | Maguire |
| 7,030,890 B1 | 4/2006 | Jouet et al. |
| 7,036,092 B2 | 4/2006 | Sloo et al. |
| 7,062,536 B2 | 6/2006 | Fellenstein et al. |
| 7,107,268 B1 | 9/2006 | Zawadzki et al. |
| 7,117,445 B2 | 10/2006 | Berger |
| 7,120,646 B2 | 10/2006 | Streepy |
| 7,127,476 B2 | 10/2006 | Narahara |
| 7,137,074 B1 | 11/2006 | Newton et al. |
| 7,139,800 B2 | 11/2006 | Bellotti et al. |
| 7,209,246 B2 | 4/2007 | Suda et al. |
| 7,243,125 B2 | 7/2007 | Newman et al. |
| 7,320,105 B1 | 1/2008 | Sinyak et al. |
| 7,421,664 B2 | 9/2008 | Wattenberg et al. |
| 7,421,690 B2 | 9/2008 | Forstall et al. |
| 7,454,716 B2 | 11/2008 | Venolia |
| 7,487,458 B2 * | 2/2009 | Jalon et al. ................ 715/765 |
| 7,505,974 B2 | 3/2009 | Gropper |
| 7,512,901 B2 | 3/2009 | Vong et al. |
| 7,523,126 B2 * | 4/2009 | Rivette et al. ............ 1/1 |
| 7,836,391 B2 * | 11/2010 | Tong ................ 715/234 |
| 7,844,906 B2 * | 11/2010 | Berger ................ 715/747 |
| 7,908,566 B2 | 3/2011 | Wilcox et al. |
| 7,917,867 B2 | 3/2011 | Wattenberg et al. |
| 8,199,899 B2 * | 6/2012 | Rogers et al. ............ 379/265.01 |
| 8,281,247 B2 * | 10/2012 | Daniell et al. ................ 715/752 |
| 2002/0004793 A1 | 1/2002 | Keith, Jr. |
| 2002/0019827 A1 | 2/2002 | Shiman et al. |
| 2002/0049610 A1 * | 4/2002 | Gropper ............ 705/1 |
| 2002/0051015 A1 | 5/2002 | Maloba |
| 2002/0073112 A1 | 6/2002 | Kariya |
| 2002/0073157 A1 | 6/2002 | Newman et al. |
| 2002/0080187 A1 | 6/2002 | Lawton |
| 2002/0084991 A1 | 7/2002 | Harrison et al. |
| 2002/0099775 A1 | 7/2002 | Gupta et al. |
| 2002/0120633 A1 | 8/2002 | Stead |
| 2002/0120858 A1 | 8/2002 | Porter et al. |
| 2002/0128047 A1 | 9/2002 | Gates |
| 2002/0138834 A1 | 9/2002 | Gerba et al. |
| 2002/0174183 A1 | 11/2002 | Saeidl |
| 2002/0186252 A1 | 12/2002 | Himmel et al. |
| 2002/0194280 A1 | 12/2002 | Altavilla et al. |
| 2003/0014482 A1 | 1/2003 | Toyota et al. |
| 2003/0101065 A1 | 5/2003 | Rohall et al. |
| 2003/0146941 A1 | 8/2003 | Bailey et al. |
| 2003/0154212 A1 | 8/2003 | Schirmer et al. |
| 2003/0163537 A1 | 8/2003 | Rohall et al. |
| 2003/0167310 A1 | 9/2003 | Moody et al. |
| 2003/0218637 A1 | 11/2003 | Sloo et al. |
| 2003/0226152 A1 | 12/2003 | Billmaier et al. |
| 2004/0046776 A1 | 3/2004 | Phillips et al. |
| 2004/0056899 A1 | 3/2004 | Sinclair |
| 2004/0068544 A1 | 4/2004 | Malik et al. |
| 2004/0073616 A1 | 4/2004 | Fellenstein et al. |
| 2004/0243926 A1 | 12/2004 | Trenbeath et al. |
| 2004/0260756 A1 | 12/2004 | Forstall et al. |
| 2004/0268265 A1 | 12/2004 | Berger |
| 2005/0004989 A1 | 1/2005 | Satterfield et al. |
| 2005/0108345 A1 | 5/2005 | Suzuki |
| 2005/0108351 A1 | 5/2005 | Naick et al. |
| 2005/0144569 A1 | 6/2005 | Wilcox et al. |
| 2005/0144570 A1 | 6/2005 | Loverin et al. |
| 2005/0144571 A1 | 6/2005 | Loverin et al. |
| 2005/0144572 A1 | 6/2005 | Wattenberg et al. |
| 2006/0271381 A1 | 11/2006 | Pui |
| 2008/0114838 A1 * | 5/2008 | Taylor ............ 709/206 |
| 2008/0270935 A1 | 10/2008 | Wattenberg et al. |
| 2011/0099510 A1 | 4/2011 | Wilcox et al. |

FOREIGN PATENT DOCUMENTS

| | | |
|---|---|---|
| EP | 1077417 | 2/2001 |
| EP | 1232434 | 8/2005 |
| JP | 08286871 | 11/1996 |
| JP | 09326822 | 12/1997 |
| JP | 2001325296 | 11/2001 |
| JP | 2003271526 | 9/2003 |
| KR | 20020050785 | 6/2002 |
| WO | 9724684 | 7/1997 |
| WO | 9744748 | 11/1997 |
| WO | WO9744748 | 11/1997 |
| WO | 0123995 | 4/2001 |

OTHER PUBLICATIONS

Smith, Marc A., et al., "Visualization Components for Persistent Conversations", CHI 2001, vol. No. 3, Issue No. 1, Mar. 31-Apr. 5, 2001, pp. 136-143.

Rohall, Steven L, et al., "Email Visualizations to Aid Communications", IEEE Symposium on Information Visualization, Oct. 22-23, 2001, 5 pages.

Murat A. Tekalp, Block-Based Methods, Digital Video Processing, Prentice Hall Processing Series, Aug. 12, 1995, pp. 98-116, Prentice Hall PTR.

Series H: Audiovisual and Multimedia Systems; Infrastructure of audiovisual services—Coding of moving video; Advanced video coding for generic audiovisual services. H.264. Version 1. International Telecommunication Union. Dated May 2003.

* cited by examiner

FIG. 2B

Day 1    (12 items off screen)
         ⓘ Laura Hanson    For Thursday's budget meeting
         ◌ Sue Cassin      Diversity hiring goals
2:00 pm  ⓘ John DeJoy      Let's hook up for the awards dinner
         ⓘ John DeJoy      my cellphone number
4:00     ⓘ David Corell    Distribute last minute changes to budget team    HR Teamroom
         ChemDigest        Chemicals Digest: Day 1
         Plastic Daily     Plastics Daily: New OSHA Fumes Rule has Indus...  Finance Teamrc
         ⓘ Accounting      Latest numbers on research lab aquistion         Newsletter DB
6:12     ⓘ Ben Fields      📎 6+ Vulcan Presentation Review Thur at 4pm     Newsletter DB
         ⓘ Laura Hanson    Optional reading for the budget review           Finance Teamrc
         ⓘ John DeJoy      Awards dinner listings Day 2    (36 items)
Day 3
7:00 am  ⓘ Sue Cassin      Hiring meeting agenda (thur 5pm)
         ⓘ Laura Hanson    FYI: We are seeing DuPont this week              Sales Leads
7:18     ⓘ Mike Rowles     📎 6+ Re: Vulcan wants longer contract
         ⓘ Ben Fields      Re: GE Roadmap presentation first draft
         Austin Chem       Join us for a special evening
9:00     CP Marketing      Consolidated Plastics wins RebokMP3 contract
         ◌ Jane Rolles     Marsha's party location
         Sam Racicot       Can we meet next week?                          + Sales lead Secondary Highlighting 248

Selection Highlighting 244

COLOR CODING AND SELECTION HIGHLIGHTING OF E-MAIL ITEM LISTING

CROSS-REFERENCE TO RELATED APPLICATIONS

This application is a continuation application of U.S. patent application Ser. No. 10/745,485, filed Dec. 29, 2003. This application is related to U.S. Published Patent Application No. 2005/0144571 entitled "System and Method for Secondary Selection Highlighting," U.S. Pat. No. 7,421,664, entitled "System and Method for Providing a Category Separator in a List of Documents," and U.S. Published Patent Application No. 2005/0144569 entitled "System and Method for Scrolling Among Categories in a List of Documents." Each of the above applications and/or patents is incorporated herein by reference in its entirety.

TECHNICAL FIELD

The invention relates to features to assist a user in selecting, identifying, and handling items such as email messages.

BACKGROUND

Some conventional email systems use color coding to identify certain items that have a field or attribute with a particular value. This allows those items to be easily identified. For example in an email context, a name of a particular sender may be highlighted a particular color for each message sent by the particular sender (i.e. if sender is "Paul Smith" then item background color is "blue"). Typically, the color coding is applied to the particular field or attribute (i.e., the name, date, subject), rather than the entire item that includes the particular attribute.

Further, some conventional email systems use highlighting to indicate that a particular item (or items) have been selected. Typically, this "selection highlighting" results in the entire line corresponding to the item to be highlighted with a particular color. However, a problem arises with those systems that use both selection highlighting and color coding in that many times a user cannot see or distinguish between the selection highlighting and the color coding at the same time.

In order to accommodate this problem, some conventional systems that use color coding typically use an altogether different mechanism for selecting items, such as, for example, selection boxes or outlines. However, these conventional mechanisms of selecting do not distinguish the selected message as readily as selection highlighting.

What is needed is a mechanism to provide both selection highlighting and color coding in a single item.

SUMMARY

The invention relates to color selection features to assist a user in selecting, identifying, and handling items such as email messages. More particularly, the invention provides a color coordination selection feature that accommodates color coding and selection highlighting.

According to one embodiment of the invention, a method for rendering an e-mail item listing within a graphical user interface of an e-mail application on a display device is disclosed. Each item of the e-mail item listing can include a plurality of fields and at least some of the plurality of fields can include a displayed value. The method further includes identifying a field of the e-mail item listing having a displayed value that matches a pre-determined value, applying a color coding to the identified field so that the color coding is visually distinguishable from a background color of the e-mail item listing, receiving an input from an input device to select either an item of the e-mail item listing that includes a color coded field or an item related to the item that includes the color coded field, and applying a selection highlighting to the item that includes the color coded field so that the applied selection highlighting is visually distinguishable from the color coded field and the background color.

Other objects and features of the invention will become apparent from the following detailed description considered in connection with the accompanying drawings. The drawings are designed for purposes of illustration only and the invention is not limited to the particulars shown therein. Various alternatives and modifications within the scope of the invention will be apparent from the description contained herein.

BRIEF DESCRIPTION OF THE DRAWINGS

FIGS. 2A and 2B illustrate various features provided by a selection color module according to various embodiments of the invention.

DETAILED DESCRIPTION

Various embodiments of the invention are described below in terms of email systems that include one or more messages. However, it will become apparent from reading the following specification how various aspects of the invention may be used with other types of systems that include one or more items, such as, for example, file systems.

Figure 1:
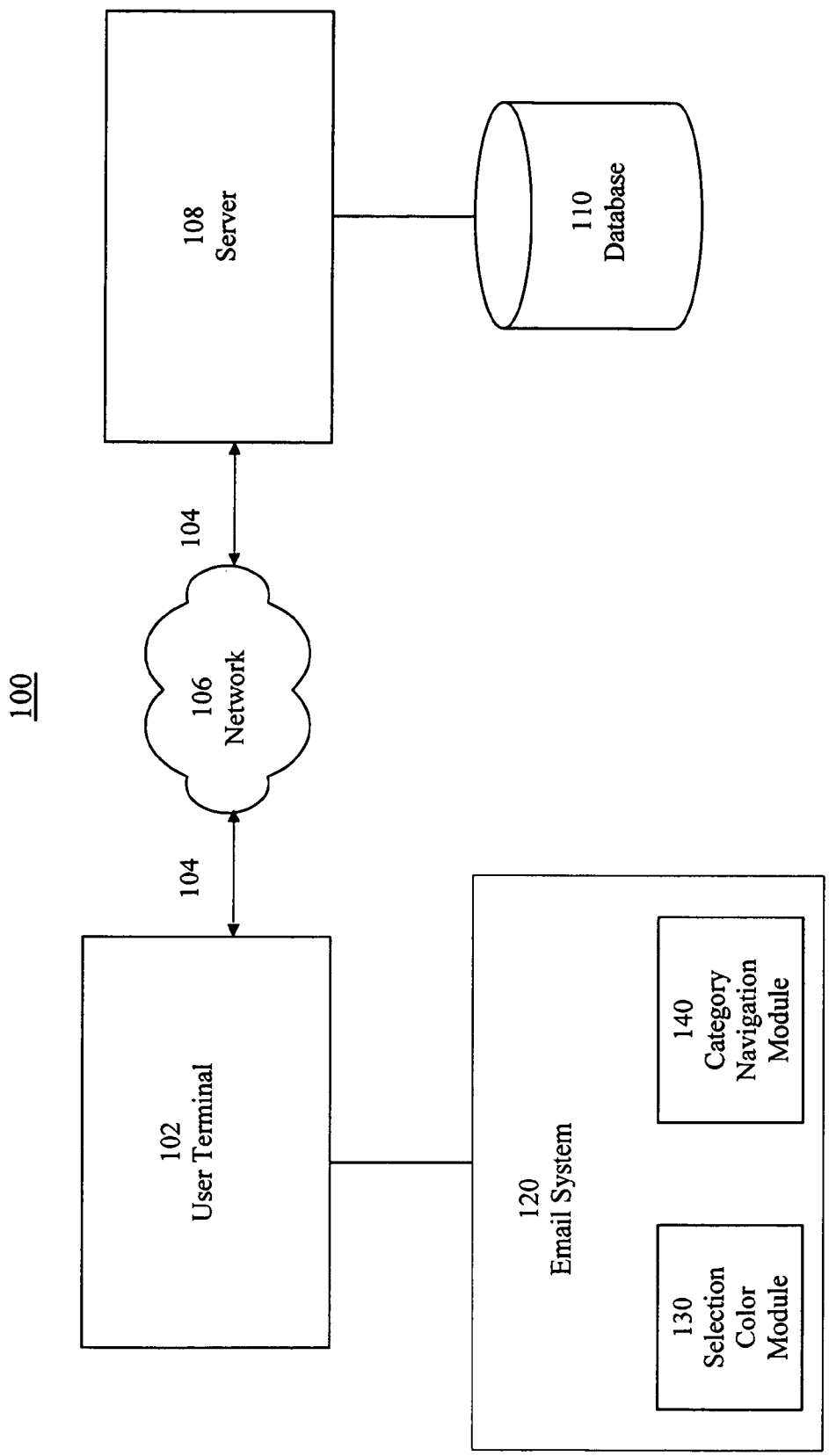
FIG. 1 illustrates a system according to one embodiment of the invention.

FIG. 1 illustrates a system 100 that may be used in accordance with various embodiments of the invention. Accordingly to the invention, system 100 may provide various features, such as, for example, enhanced visual email features, to assist a user in selecting, identifying, and handling items, such as email messages. In some embodiments of the invention, system 100 includes one or both of a selection color module 130 and a category navigation module 140. Selection color module 130 may provide the user with various color coordination features. Category navigation module 140 may assist the user in navigating the displayed messages.

In the embodiments illustrated in FIG. 1, selection color module 130 and category navigation module 140 may be utilized on or in conjunction with an email system 120 located at or operable with a user terminal 102. Although various embodiments of the invention are described utilizing selection color module 130 and category navigation module 140 on user terminal 102, it shall be understood by those skilled in the art that selection color module 130 and/or category navigation module 140 may be located on a 108 server or any machine or machines associated with user terminal 102.

User terminal 102 is coupled to a server 108 over a network 106 via a communications link 104. Examples of user terminal 102 may include any one or more of, for example, a desktop computer, a laptop or other portable computer, a hand-held computer device such as a Blackberry, a Personal Digital Assistant (PDA), a web-enabled mobile phone, or a Palm Pilot, or any other computer device.

Network 106 may include any one or more networks. For instance, network 106 may include the Internet, an intranet, a PAN (Personal Area Network), a LAN (Local Area Network), a WAN (Wide Area Network), a SAN (Storage Area Network), a MAN (Metropolitan Area Network), or other network.

Communications link 104 may include any one or more communications links. For instance, communications link 104 may include a copper telephone line, a Digital Subscriber Line (DSL) connection, a Digital Data Service (DDS) connection, an Ethernet connection, an Integrated Services Digital Network (ISDN) line, an analog modem connection, a cable modem connection, a wireless connection, or other communications link.

Server 108 may be or include, for instance, a workstation running Microsoft Windows™ NT™, Microsoft Windows™ 2000, Unix, Linux, Xenix, IBM, AIX™, Hewlett-Packard UX™, Novell Netware™, Sun Microsystems Solaris™, OS/2™, BeOS™, Mach, Apache, OpenStep™, or other operating system or platform.

As illustrated in FIG. 1, a database 110 may be operatively coupled to server 108. Database 110 may store or otherwise include any information or data used by system 100. Although database 110 is illustrated as operatively coupled to server 108, it shall be understood by those skilled in the art that database 110 may be located on user terminal 102 or any machine or machines associated with user terminal 102 or operatively coupled to server 108 via a network as would be apparent.

Database 110 may store or otherwise include any type of data or information. Database 110 may include, or interface to, for example, the Oracle™ relational database sold commercially by Oracle Corporation, Informix™, DB2 (Database 2) or other data storage or query formats, platforms, or resources such as OLAP (On Line Analytical Processing), SQL (Standard Language Query), a SAN (storage area network), Microsoft Access™ or any other type of database.

Figure 2A:
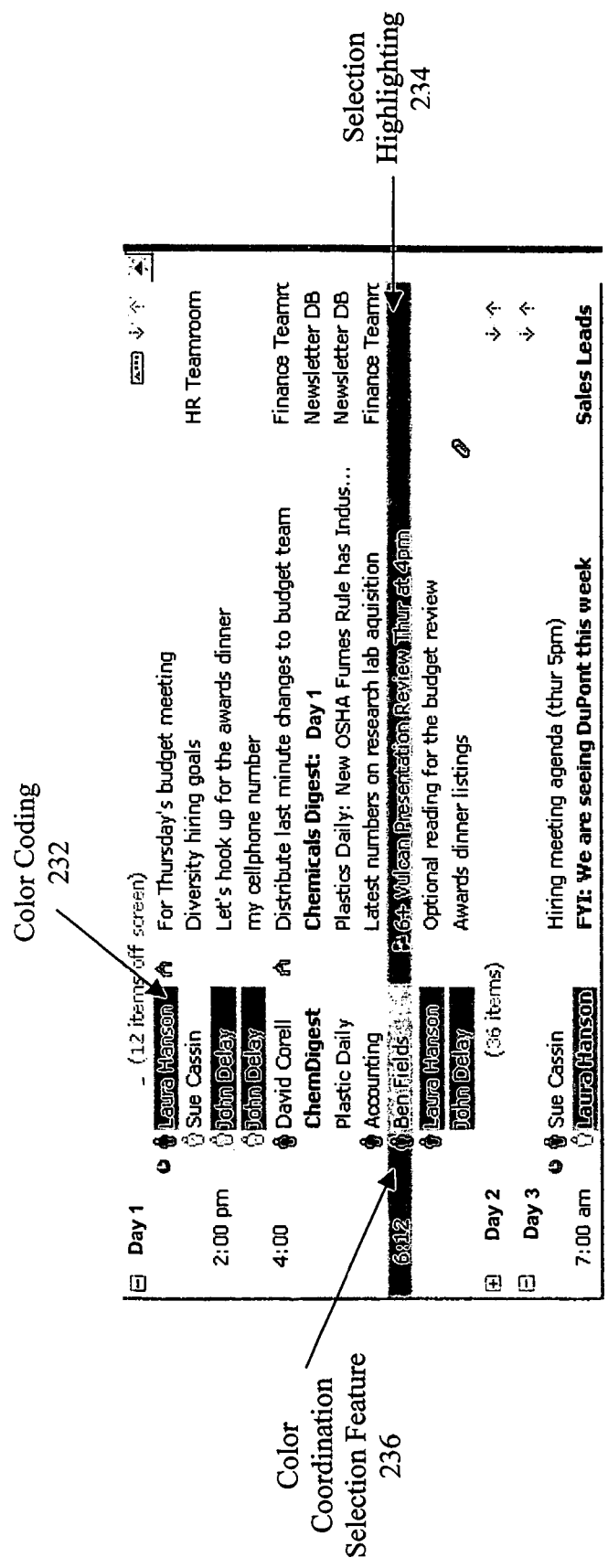

FIG. 2A illustrates various color coordination selection features provided by selection color module 130 to assist a user in selecting, identifying, and/or handling email messages in accordance with one or more embodiments of the invention. Selection color module 130 provides for both a color coding 232 and a selection highlighting 234 of an item so that a user may distinguish between the two, as described below.

Some conventional email systems use color coding 232 to identify certain items that have a field or attribute with a particular value allowing these items to be easily identified. In FIG. 2A, for example, a name "Laura Hanson" is color coded in green, a name "John Delay" is color coded in pink, and a name "Ben Fields" is color coded in yellow. As illustrated, color coding 232 is typically applied to the particular field or attribute (i.e., the name, date, subject), rather than the entire message that includes the particular attribute.

Some conventional email systems use selection highlighting 234 to indicate that a particular message has been selected. In conventional systems, selection highlighting 234 results in the entire line corresponding to a selected message to be highlighted with a particular color. For example, as illustrated in FIG. 2A, a message from "Mike Rowles" is highlighted in a royal blue color to indicate it as the selected message.

In some embodiments of the invention, selection highlighting 234 and color coding 232 are combined into a color coordination selection feature 236 with regard to a single message whereby a user may distinguish between them. In some embodiments of the invention, selection color module 130 implements a selection coloring mechanism or process that color codes one or more portions of the selected item that have a particular value(s) and highlights the remaining portions of the selected item. According to the invention, if both selection highlighting 234 and color coding 232 apply to the selected item, both may be distinguished by a user. As will be discussed in further detail below, selection highlighting 234 may be applied to a selected messages as well as messages related to the selected message. As would be appreciated, color coordination selection feature 236 may be applied to various messages—selected, related, or otherwise—to coordinate aspects of more than one color or highlighting operation applied to a single message.

As illustrated in FIG. 2A, a message from "Ben Fields" entitled "6+Vulcan Presentation Review Thur at 4 pm" illustrates color coordination selection feature 236 that combines color coding 232 and selection highlighting 234. Color coding 232 results in "Ben Fields" being color coded in yellow, while the remaining portions of the message are highlighted in light blue.

As will be discussed in further detail below with regard to other aspects of the invention, highlighting, such as selection highlighting 234, may be applied to a selected messages as well as messages related to the selected message. As would be appreciated, color coordination selection feature 236 may be applied to various messages—selected, related, or otherwise—to coordinate aspects of more than one color or highlighting operation applied to a single message.

FIG. 2A illustrates another color coordination selection feature provided by selection color module 130 to assist a user in selecting, identifying, and/or handling email messages in accordance with one or more embodiments of the invention. Selection color module 130 provides for secondary highlighting features to indicate to a user a relationship between a selected message and one or more other messages.

In some embodiments of the invention, secondary highlighting is applied to a message when that message is related to a message selected by the user. Once a user selects a message, selection color module 130 determines if any other messages are related to the selected message. For example, FIG. 2B illustrates a selection highlighting 244 (similar to selection highlighting 234 in FIG. 2A), in which a selected message from "Mike Rowles" entitled "6+Re: Vulcan wants longer contact" is highlighted in a royal blue color. A message from "Ben Fields" entitled "6+Vulcan Presentation Review Thur at 4 pm" is related to the selected message. According various embodiments of the invention, a secondary highlighting 248 is applied to the related message (i.e., the message from "Ben Fields"). In this example, the related message is highlighted in a light blue color. As would be appreciated, various colors for secondary highlighting 248 may be used, including the same color applied for selection highlighting 244.

Messages may be identified as related to the selected message through various mechanisms. One mechanism includes identifying items with matching attribute values, such as subject matter or keywords included in the subject line or message itself. Other mechanisms may utilize various threading services such as those described in U.S. patent application Ser. No. 10/334,087 (Publication No. U.S. 20030163537A1), entitled "Method and Apparatus for Handling Conversation Threads and Message Groupings as a Single Entity," filed Dec. 30, 2002, and U.S. patent application Ser. No. 09/995,151 (Publication No. U.S. 20030101065A1), entitled "Method and Apparatus for Maintaining Conversation Threads in Electronic Mail," filed Nov. 27, 2001, the specifications of which are herein incorporated by reference in their entirety. It should be noted that the invention is not limited to any particular mechanism for determining threads among a set of documents including email messages. Once the selection color module determines if there are any related messages, the related messages are indicated as such using secondary highlighting 248.

As would be appreciated, various colors for secondary highlighting 248 may be used, including the same color applied for selection highlighting 244. In some embodiments of the invention, the color of secondary highlighting 248 (i.e., "secondary color") is based on or otherwise related to the color of selection highlighting 244 (i.e., "selection color"). In these embodiments, when the selection color is changed, the secondary color is changed in accordance with the selection color. In some embodiments of the invention, the secondary color is changed in proportion to the change in the selection color. In some embodiments of the invention, the secondary color is derived from the selection color. For example, as illustrated in FIG. 2B, a light blue color is used for secondary highlighting 248, which is derived from a royal blue color of selection highlighting 244.

Coordination the selection color with the highlighting color is desirable for aesthetic reasons. This coordination also assists the user in identifying the various highlighted items, especially, when high contrast colors are used.

Figure 3:
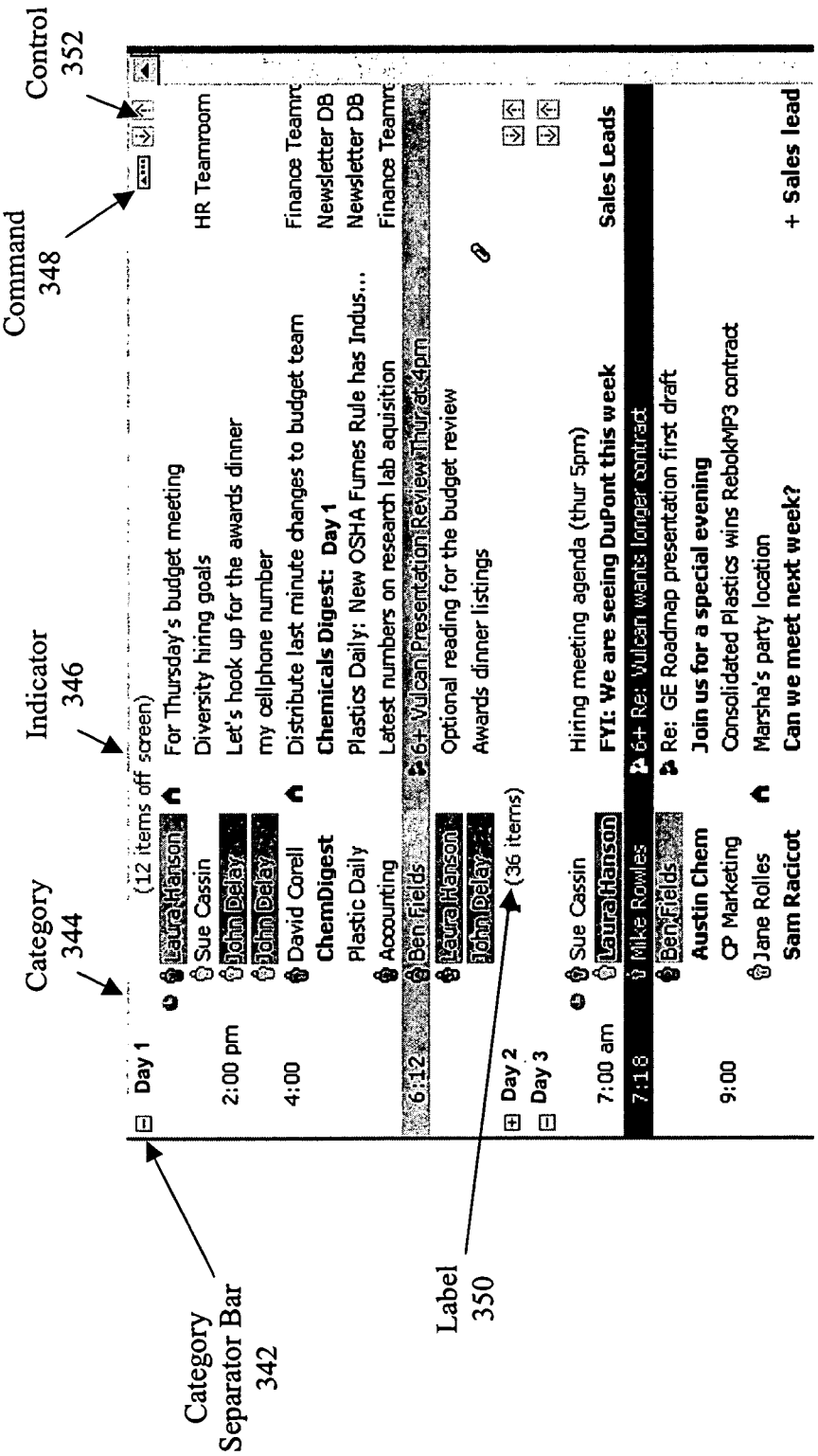
FIG. 3 illustrates features provided by a category navigation module according to one embodiment of the invention.
Figure 4:
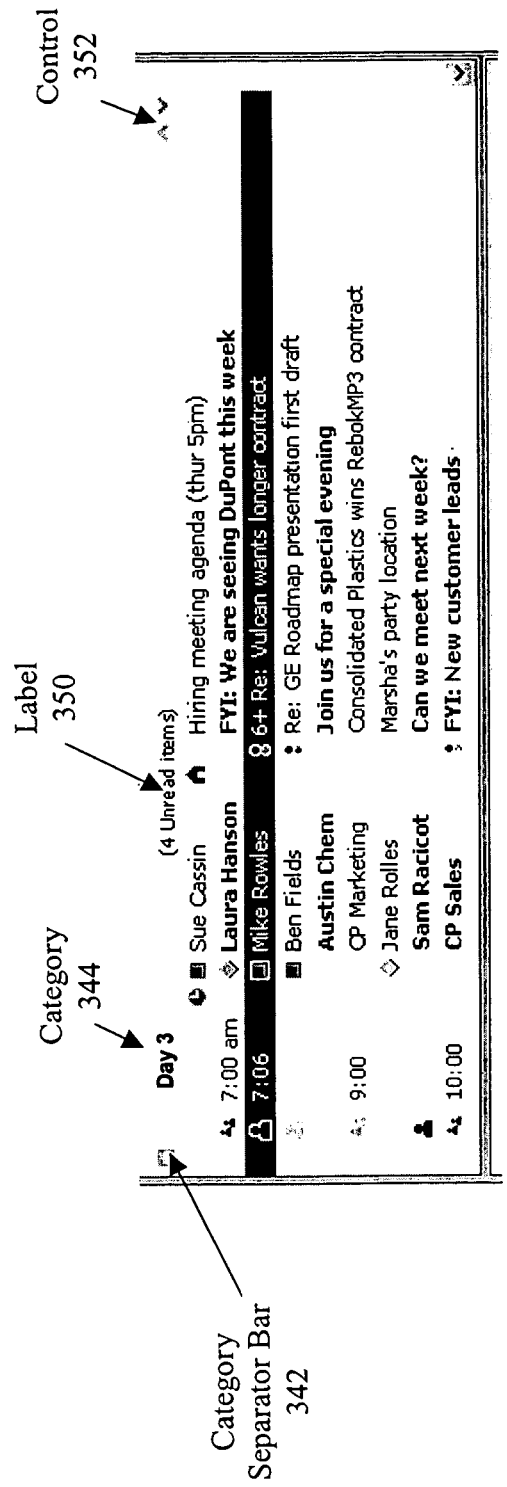
FIG. 4 illustrates a label that indicates a number of items in a particular category of items according to one embodiment of the invention.

FIG. 3 and FIG. 4 illustrate various aspects of the invention provided via category navigation module 140. Category navigation module 140 assists the user with navigating among displayed items, such as email messages.

FIG. 3 illustrates an indicator 346 that provides a user with a number of items that are "off screen" for a particular category 344. In some embodiments of the invention, off screen items may include those items "above" the first line on a display. In other embodiments of the invention, off screen items may include those items "below" the last line on a display. In still other embodiments, off screen items include both those above and below the first and last lines, respectively.

In some embodiments of the invention, category navigation module 140 displays items, such as email messages, by categories, such as a category 344. For example, in FIG. 3, category 344 includes a date. As illustrated, these dates include: "Day 1," "Day 2," and "Day 3." Messages may be separated into various categories as would be appreciated, including, but not limited to, author, subject matter, importance, or any other category.

In some embodiments of the invention, categories 344 are separated with a category separator bar 342. Category separator bar 342 controls the display of categories 344 such that the user may expand or collapse the messages included therein. For example, as illustrated in FIG. 3, messages in "Day 1" and "Day 3" are expanded, whereas messages in "Day 2" are collapsed.

In some embodiments of the invention, when a user scrolls through the messages included in a particular category 344, such that some messages of the particular category 344 are scrolled off screen above the first line, category separator bar 342 remains in view by becoming fixed in the first line of the display.

In some embodiments of the invention, while messages included in a particular category 344 are partially on-screen with some messages scrolled above the fixed category separator bar 342, category navigation module 140 may display indicator 346 that provides the user with an indication of a number of messages that are off screen for that category 344. For example, in FIG. 3, indicator 346 reads "12 items off screen" to illustrate to the user that 12 messages included in the category "Day 1" are not displayed on the screen. As would be appreciated, indicator 346 may refer to a number of items above the first line, a number of items below the last line, or a combination of the two.

In some embodiments of the invention, if all messages in a particular category 344 are displayed on the screen, indicator 346 may not be displayed. For example, as illustrated in FIG. 3, there is no indicator 346 for the category entitled "Day 3," illustrating to the user that all messages in the category are displayed on the screen.

In some embodiments of the invention, category navigation module 140 provides a command 348 that causes the first entry of a particular category 344 to be scrolled into view. Accordingly, when indicator 346 illustrates to the user that a certain number of items of a particular category 344 are off screen, the user can invoke command 348 thereby causing the first message of the particular category 344 to be displayed. When the user selects command 348, no items of the particular category 344 are located above category separator bar 342.

In some embodiments of the invention, if all messages of a particular category 344 are displayed on the screen, command 348 is not displayed. Because all messages in the particular category 344 are displayed on the screen, the first message of the particular category 344 is already displayed and there may be no need to provide this functionality. For example, as illustrated in FIG. 3, the category line separator for "Day 3" does not include a command 348 because all messages in the category are already displayed on the screen. If a message in such a category becomes displaced from the screen, command 348 would be included in this category line separator as would be appreciated.

In some embodiments of the invention, category navigation module 140 may provide a label 350 to indicate the number of items in a particular category 344 matching a particular criteria. The particular criteria may be directed toward any characteristic of the message including, but not limited to, a number of messages included in a particular category, a status of the messages (i.e., unread or read), a level of importance of the messages (i.e., urgent or high importance), or other characteristic of the message(s).

For example, as illustrated in FIG. 3, label 350 corresponds to a number of messages included in the category "Day 2" as "36 items". As illustrated, label 350 may be provided even when category separator bar 342 is collapsed and not showing any messages included in a particular category 344.

A further example is illustrated in FIG. 4 where a label 350 corresponds to a number of items unread ("4 Unread items") in the category "Day 3." Label 350 may be displayed when indicator 346 is not required (i.e., all messages in the category are displayed on the screen), when indicator 346 is not desired to be displayed (i.e., the user does not want indicator 346 to be displayed), when indicator 346 is not able to be displayed (i.e., email system 120 cannot display indicator 346), or in conjunction with indicator 346 (i.e., indicator 346 and label 350 may both be located in category separator line). Further, in some embodiments of the invention, category navigation module 140 may display multiple labels 350 to illustrate various characteristics of a particular category 344.

According to another embodiment of the invention, category navigation module 140 may provide a control 352 on at least one category separator line 342 for scrolling between categories. As illustrated in FIGS. 3 and 4, control 352 may include an "up" arrow symbol to correspond with, for example, a previous category, and a "down" arrow symbol to correspond with, for example, a next category. However, various symbols or indicators may be used to indicate scrolling between next or previous categories.

In some embodiments of the invention, control 352 changes the selected category from one category to either the next category or the previous category, depending on which symbol is invoked. If more than one category is displayed on the screen, these categories continue to be displayed while the selected category is changed via control 352. For example, as illustrated in FIG. 3, a user wishing to display a category corresponding to Wednesday of the prior week may do so by invoking control 352 on category separator bar 342 for "Day 2" a number of times. More specifically, the user may click the up arrow symbol seven times, each of which would change the selected category to the previous day, ultimately changing to the same weekday in the prior week.

In some embodiments of the invention, when control 352 is invoked, the categories remain in their positions relative to one another, and the display scrolls back through each of the prior days. In other embodiments of the invention, only the category corresponding to the invoked control 352 is changed while the other categories displayed remain the same. Thus, in the example described above where the user invoked the up arrow symbol seven times, the display of FIG. 3 would include the categories for "Day 1" and "Day 3" while the "Day 2" category will have been changed to "Day-5" (i.e., corresponding to the same weekday in the prior week).

While particular embodiments of the invention have been described, it is to be understood that modifications will be apparent to those skilled in the art without departing from the spirit of the invention. The scope of the invention is not limited to the specific embodiments descried herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A method, comprising:
   outputting, for display within a graphical user interface of an e-mail application on a display device, an e-mail item listing, wherein each item of the e-mail item listing corresponds to a respective e-mail message and includes a plurality of fields that are arranged adjacent to one another, and each field includes text that relates to the respective e-mail message displayed against a background color;
   identifying one or more fields from the plurality of fields of the e-mail item listing in which the text in the field includes a displayed value that matches a pre-determined value;
   applying a color coding to only the one or more identified fields by replacing the background color of the one or more identified fields with the color coding, wherein the color coding is visually distinguishable from the background color;
   receiving an input from an input device to select either an item of the e-mail item listing that includes a color coded field or an item related to the item that includes the color coded field; and
   applying a selection highlighting to all of the fields from the item that includes the color coded field except for the identified one or more fields having an applied color coded field by replacing the background color of all of the fields from the item except for the identified one or more fields having an applied color coded field with the selection highlighting so that the applied selection highlighting is visually distinguishable in color from the color coded field and the background color.

2. The method of claim 1 wherein applying the color coding includes changing a text color of the one or more identified fields of the e-mail item.

3. The method of claim 2 wherein the text color is visually distinguishable from the background color of the e-mail listing item.

4. The method of claim 2 wherein the text color is based on the pre-determined value.

5. The method of claim 4 wherein the pre-determined value includes identifying characteristics identifying at least one of an origin, a subject matter, and a priority of the e-mail item.

6. The method of claim 1 wherein applying the color coding includes changing the background color of the one or more identified fields of the e-mail item.

7. The method of claim 6 wherein the background color of the one or more identified fields of the e-mail item is visually distinguishable from the background color of the e-mail listing item.

8. The method of claim 6 wherein the background color of the one or more identified fields of the e-mail item is based on the pre-determined value.

9. The method of claim 8 wherein the pre-determined value includes identifying characteristics identifying at least one of an origin, a subject matter, and a priority of the e-mail item.

10. The method of claim 2 wherein the color coding includes a first color and the selection highlighting includes a second color and the first color and second color are visually distinguishable from the background color of the e-mail listing item.

11. The method of claim 10 wherein the second color is a lighter shade of the first color.

12. The method of claim 10 wherein the second color is a darker shade of the first color.

13. An apparatus, comprising:
    a memory; and
    a processor configured to execute instructions stored in the memory to:
       output, for display within a graphical user interface of an e-mail application on a display device, an e-mail item listing, wherein each item of the e-mail item listing corresponds to a respective e-mail message and includes a plurality of fields that are arranged adjacent to one another, and each field includes text that relates to the respective e-mail message displayed against a background color;
       identify one or more fields from the plurality of fields of the e-mail item listing in which the text in the field includes a displayed value that matches a pre-determined value;
       apply a color coding to only the one or more identified fields by replacing the background color of the one or more identified fields with the color coding, wherein the color coding is visually distinguishable from the background color of the;
       receive an input from an input device to select either an item of the e-mail item listing that includes a color coded field or an item related to the item that includes the color coded field; and
       apply a selection highlighting to all of the fields from the item that includes the color coded field except for the identified one or more fields having an applied first color coded field by replacing the background color of all of the fields from the item except for the identified one or more fields having an applied color coded field with the selection highlighting so that the applied selection highlighting is visually distinguishable in color from the color coded field and the background color.

14. The apparatus of claim 13 wherein applying the color coding includes changing the background color of the one or more identified fields of the e-mail item.

15. The apparatus of claim 14 wherein the background color of the one or more identified fields of the e-mail item is visually distinguishable from the background color of the e-mail item listing.

16. The apparatus of claim 14 wherein the background color of the one or more identified fields the e-mail item is based on the pre-determined value.

17. The apparatus of claim 16 wherein the pre-determined value includes identifying characteristics identifying at least one of an origin, a subject matter, and a priority of the e-mail item.

18. The apparatus of claim 13 wherein the color coding includes a first color and the selection highlighting includes a second color and the first color and second color are visually distinguishable from the background color of the e-mail item listing.

19. The apparatus of claim 18 wherein the second color is a lighter shade of the first color.

20. The apparatus of claim 18 wherein the second color is a darker shade of the first color.

* * * * *